July 21, 1936. O. JACOBSEN 2,048,385
LUBRICATED PLUG VALVE
Filed Dec. 27, 1935
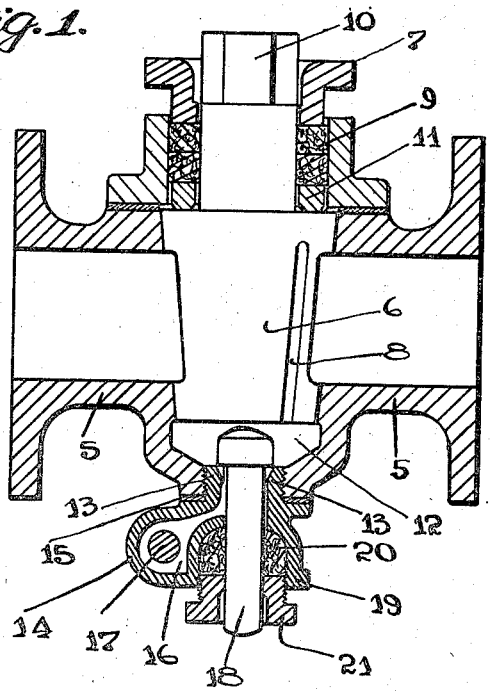
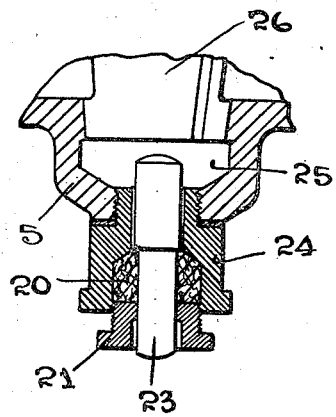
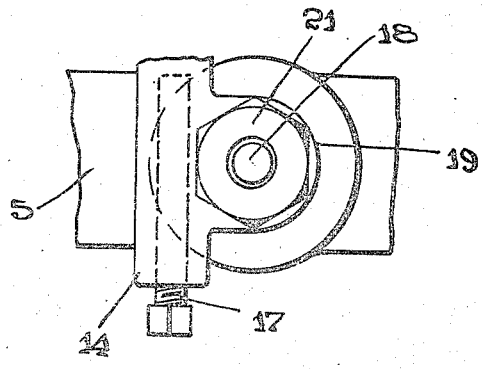
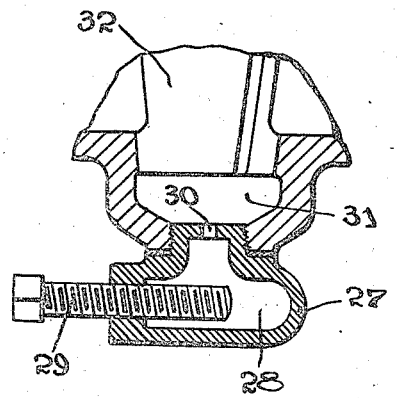
INVENTOR.
OYSTEIN JACOBSEN
BY James C. Bradley
ATTORNEY Patented July 21, 1936

2,048,385

UNITED STATES PATENT OFFICE 2,048,385

LUBRICATED PLUG VALVE

Oystein Jacobsen, Dayton, Ohio, assignor to The Duriron Company, Inc., a corporation of New York Application December 27, 1935, Serial No. 56,329

1 Claim. (Cl. 251—93)

The invention relates to lubricated cocks or valves, and has for its principal objects the provision of a valve of the type specified having improved means for lubricating the plug and lifting it with respect to its seat, in case it becomes stuck. A further object is the provision of a valve of very cheap, simple construction, which has both mechanical and hydraulic means for freeing the valve, which may be used together or independently, depending upon conditions encountered. Certain embodiments of the invention are illustrated in the accompanying drawing, wherein:

Figure 1 is a vertical section through the preferred construction. Fig. 2 is a partial bottom view. And Figs. 3 and 4 are partial vertical sections through modifications.

Referring to Figs. 1 and 2, 5 is the valve casing, 6 is the plug or cock, and 7 is the follower of a stuffing box. The plug is tapered, as shown, and has the lubricating grooves 8. Suitable packing 9 is employed around the stem or shank 10 of the plug, such packing lying above the wear ring 11. The follower is adjusted downward to compress the packing by the usual bolts which are not shown. The upper end of the plug shank is formed so as to permit the application of a handle or wrench.

Located beneath the plug is a lubricant chamber 12 with which the grooves 8 communicate at their lower ends. An opening is provided in the bottom wall of the chamber, and into this opening is threaded the upper end 13 of the closure member 14, a gasket 15 being provided to insure a seal. The member 14 is provided with a lubricant cavity 16, and through the side of the cavity is threaded a screw 17. The plug is lubricated by turning the screw at suitable intervals to move it inward, which action applies pressure to the lubricant in the cavity 16 and the chamber 12 forcing it upward through the grooves 8. If the plug becomes stuck, it may be loosened by turning the screw until the plug is lifted from its seat.

The valve may also be loosened in case of sticking by the plunger 18 which extends through the member 14 and chamber 12 with its upper end or head in proximity with the lower end of the plug. To accomplish this result, the lower end of the plunger is tapped with a hammer until the valve is freed from its seat. The member 14 is provided with a stuffing box 19 provided with packing 20 which is compressed by the follower 21. The plunger acts more quickly and positively than the hydraulic plug lifting means, and may be used to advantage where a quick freeing of the plug is necessary or in cases in which the lubricant has become exhausted.

Fig. 3 illustrates a modification, in which only the mechanical plug freeing means is employed, such means comprising the plunger 23 mounted in the closure member 24 as in the construction of Figs. 1 and 2. The lubricant chamber 25 may be supplied with lubricant from above from suitable supply means through the grooves in the plug 26.

Fig. 4 shows a further modification, in which the mechanical plug freeing means is omitted, the construction in other respects following that of Figs. 1 and 2. The closure member 27 has a cavity 28 for lubricant and carries the screw 29 for feeding the lubricant up through the opening 30 to the lubricant chamber 31 beneath the plug 32.

What I claim is:

In combination in a plug cock, a casing open at its upper end having a tapering seat and a chamber or recess for lubricant below the seat with an opening through its bottom wall, a tapering plug, a hollow closure member for said chamber secured to the casing in sealing relation with said opening and having an opening axially of the plug, a screw threaded through said member transversely of the center line of the plug at one side thereof and adapted to apply pressure to the lubricant in the member when it is screwed inward, and a plunger mounted for sliding movement through the member axially of the plug and adapted, when struck at its lower end, to move up and strike the lower end of the plug, the plunger and the opening in the member being formed so as to permit a flow of lubricant along the plunger from the member to said chamber.

O. JACOBSEN.